STUBER & FRANK.
Locomotive Lamp.
No. 2,128. Reissued Dec. 19, 1865.
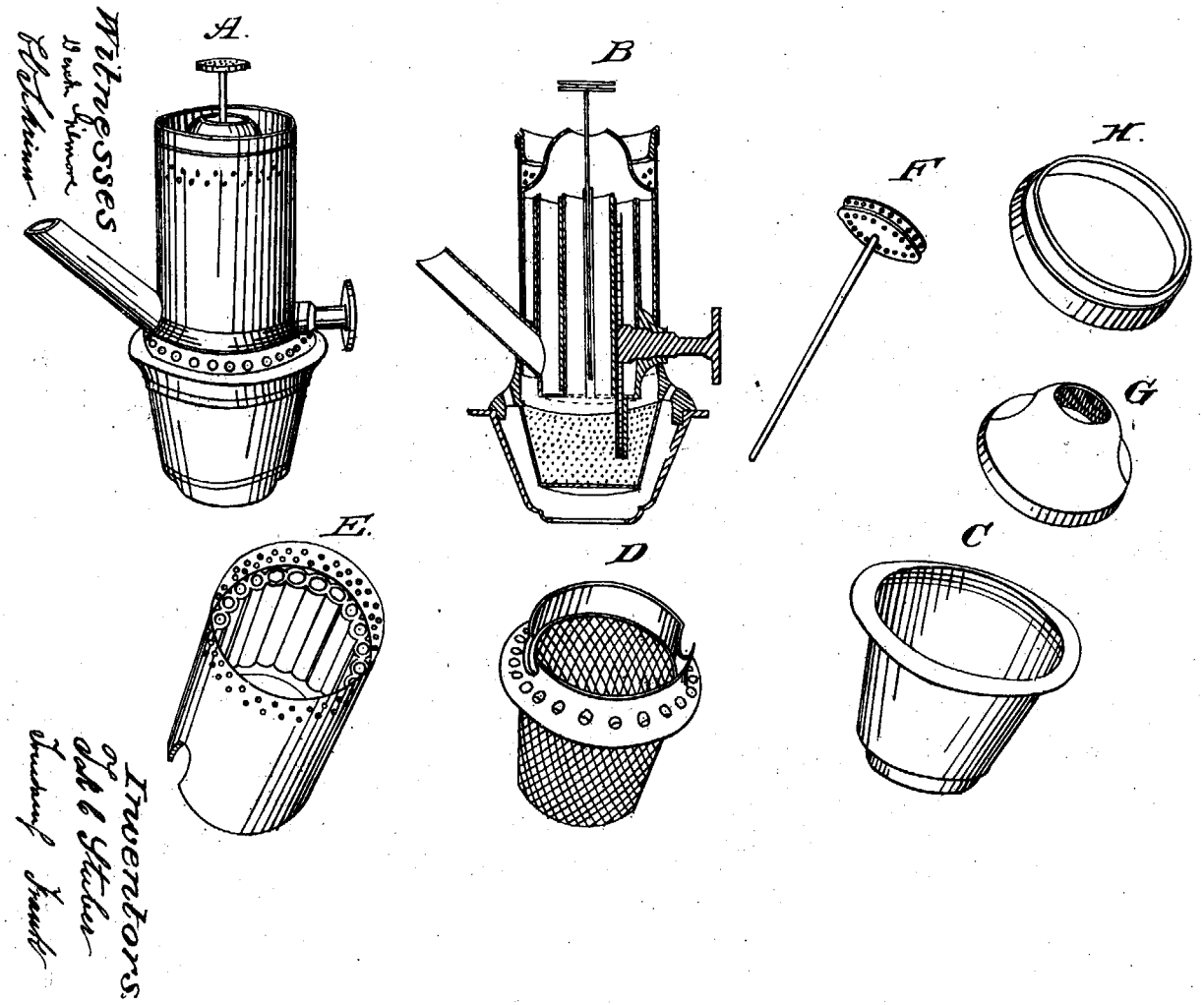
N. PETERS, Photo-Lithographer, Washington, D. C.

UNITED STATES PATENT OFFICE.

JONATHAN MAYHEW AND THOMAS S. RAY, OF BUFFALO, NEW YORK, ASSIGNEES OF J. STUBER AND F. FRANK.

IMPROVEMENT IN LOCOMOTIVE-LAMPS.

Specification forming part of Letters Patent No. 32,155, dated April 23, 1861; Reissue No. 2,128, dated December 19, 1865.

*To all whom it may concern:*

Be it known that JACOB STUBER and FREDERICK FRANK, of the city of Utica, county of Oneida and State of New York, heretofore invented certain improvements in kerosene, petroleum, and coal-oil lamps for use as head-lights for locomotive engines, for which letters Patent of the United States were on the 23d day of April, 1861, granted to them; also, be it known that the said JACOB STUBER and FREDERICK FRANK have in due form of law assigned their whole interest in the said invention, improvements, and Letters Patent to JONATHAN MAYHEW and THOMAS S. RAY, of the city of Buffalo and State aforesaid: Now, therefore, we, the said JONATHAN MAYHEW and THOMAS S. RAY, assignees as aforesaid by virtue of the statute in such case made and provided, do hereby declare that the following is a full, clear, and exact description of the said invention and improvements, reference being had to the accompanying drawings, making a part of this specification, in which—

Figure I is a perspective of the said lamp with all its parts combined. Fig. II is a vertical section of the same. Fig. III is a perspective of the outside cylinder. Fig. IV is a perspective of the perforated shell or cylinder placed below the wick-tube, through which air is admitted to the flame. Fig. V is a perspective of an outer unperforated shield, which encompasses the perforated shell below the rim. Fig. VI is a perspective of the deflector. Fig. VII is a perspective of a flange or rim at the top of the outside cylinder for holding the chimney. Fig. VIII is a perspective of a double perforated button.

The nature of this invention relates, first, to a perforated shell of any convenient form located at the bottom of the wick-tube, through which air is admitted to supply either the interior or exterior of the wick and flame; second, to a cylinder which surrounds the wick-tube and is perforated with small holes for admitting air to pass through to the outside of the deflector, and between it and the chimney; third, in placing and using small tubes within the outside cylinder, to conduct a portion of the air which enters the perforated shell below up to the inside of the deflector; fourth, in devising and using a double perforated button in combination with a circular wick-tube; fifth, in extending a small tube downwardly from the oil-chamber of a cylindrical wick-tube, so as to make room for the working of the rack-bar within the oil-chamber for raising and lowering the wick; sixth, in several combinations as herein described.

Letters of like name and kind refer to like parts in each of the figures.

B is a cylindrical wick-tube. A cylindrical wick is drawn on over this tube, and is connected to a thimble, D, and raised and lowered by means of the rack E and pinion F. There is a larger cylinder or tube, G, which is placed outside of the wick-tube. These two tubes are connected by a bottom piece, so as to form an annular oil and wick chamber between them. This chamber is kept full of oil by means of the pipe H, which connects with an oil-reservoir outside of the lamp, so that the oil needs to be drawn up the wick but a short distance by capillary attraction before reaching the flame. The oil-chamber is extended downwardly by means of the small flat tube I, in order to gain room for the rack to drop below the wick-tube and work wholly within the oil-chamber.

J represents a cylinder of sheet-brass or other suitable metal, made in one or two parts as may be convenient. This cylinder surrounds the oil-chamber and wick-tube, and is perforated near the top with small holes, as shown at J′, so that the air may pass through to the outside of the deflector and between it and the chimney C, in order to increase the draft through the chimney C and assist in feeding air to the outside of the flame.

K, Fig. III, represents air-tubes, which are placed inside of the cylinder, to conduct a portion of the air which enters the perforated basket or shell at the bottom, up to the inside of the deflector to feed air to the exterior flame. They divide the volume of air into smaller currents, which comm ingle again before they reach the flame. They may or may not be used, as preferred. It is evident that the cylinder would conduct the air up in a volume without these tubes.

L represents a perforated shell or basket, which is connected to the lamp below the wick-tube in any convenient manner. The basket or shell part of this is made of perforated tin or other suitable material. It has a flange or rim, L′, around its top, which has a row of larger holes, $l^3$, through which air is admitted into the chamber $L^2$, which chamber is formed when the outside unperforated shield M is put on. All the air, which passes up the interior of the wick-tube to supply the interior of the wick tube and flame, must first be strained through this perforated shell. Also, all the air which passes up the cylinder J (whether it is made with or without the air-tubes K) to supply the exterior of the flame, must first pass through this perforated shell. The external unperforated shield M, Fig. V, is so formed that it may be screwed onto the rim L′, and taken off at pleasure. When it is put on, the air then comes into the chamber $L^2$ through the large holes $l^3$. It is intended to protect the perforated shell against strong and unsteady currents of air when the engine is running against the wind, and is so constructed that it can be used or not, as deemed expedient. The perforated shell will serve its purpose of sifting the air before it reaches the flame without it.

N represents a cap or deflector, which is placed over the wick-tube and inside of the cylinder J, in order to circumscribe and direct a uniform volume of air upon the exterior flame, and also for the purpose of forming an air and combustion chamber around and above the base of the flame. This deflector projects upwardly a little above the cylinder J. The rim or flange O is placed on the top of the cylinder J. The chimney sets into this rim. It is not, however, deemed important for the reason that the chimney may be supported by other devices.

P is a double perforated button supported upon a stem, P′, which enters a small tube, $P^2$, within the wick-tube, and may be raised and lowered thereby, as desired. This double perforated button is found to answer a better purpose than a single solid button.

R represents short tubes, placed on the inside of the cylinder J, which bear against the outside cylinder of the oil-chamber, and thereby support and steady the cylinder J.

The inventors ascertained at an early day that lamps of ordinary construction would not burn kerosene or coal oil without smoking, and that lamps which would burn the hydrocarbon oils, when standing upon a table in a room, would smoke and flicker if moved quickly from place to place, and especially such lamps would not answer for head-lights for locomotive-engines, whose forward movements are so rapid, and at the same time subject to sudden jerks sidewise, for such rapid and sudden motions would produce an unsteady supply of air to the flame, and consequently an uncertain, flickering, and unsteady light. It therefore became necessary to devise some means by which air could be supplied both to the interior and exterior flame in a steady and uniform quantity without sudden puffs or fluctuations, notwithstanding the rapid and sudden motions of the engine. The fine perforated shell or cylinder through which the air is strained before it is passed to the flame, arranged and combined as hereinbefore described, was found, after many trials and experiments, to answer the purpose admirably, and the lamps were thereby adapted to burning kerosene, petroleum, and coal-oil, producing a cheap, steady, brilliant, and powerful light, and answering all the purposes required.

What we claim as the invention of the said JACOB STUBER and FREDERICK FRANK, and desire to secure by these Letters Patent, is—

1. In a kerosene or coal oil lamp constructed and used for a head-light for locomotive-engines, a perforated shell, L, (or equivalent,) through which the air is strained before it reaches the flame, in combination with a cylindrical wick-tube, B G, and deflector N, for the purposes and substantially as described.

2. An outside hollow cylinder, J, (with or without the air-tubes K,) in combination with a cylindrical wick-tube, B G, deflector N, and perforated shell L, for the purposes and substantially as described.

3. The combination of the shield M with the perforated shell L, forming an air-chamber, $L^2$, between them, substantially as described.

4. Admitting air through a perforated cylinder or shield, J, to the outside of the deflector and between the deflector and chimney, in a lamp having a cylindrical wick-tube, and used for a head-light for locomotive-engines, substantially as set forth.

5. The double perforated button P, in combination with a cylindrical wick-tube, substantially as set forth.

6. In a kerosene or coal oil lamp for head-lights for locomotive-engines, having a cylindrical wick-tube, over which the wick is drawn, and having a cylinder outside of that, which, with the wick-tube, form an annular oil-chamber, extending the oil-chamber downwardly by means of the tube I, so as to make room for the full working of the rack-bar within the oil-chamber, substantially as described.

JONATHAN MAYHEW.
THOS. S. RAY.

Witnesses:
E. B. FORBUSH,
E. OSBORNE.